(12) United States Patent
Bares et al.

(10) Patent No.: US 7,386,380 B2
(45) Date of Patent: Jun. 10, 2008

(54) COTTON HARVESTER ROW UNIT SPEED SYNCHRONIZATION CONTROL

(75) Inventors: Robert Matthew Bares, Johnston, IA (US); Jesse Dru Haecker, Ankeny, IA (US); William Edward McCoy, Ankeny, IA (US); Timothy Arthur Deutsch, Newton, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/496,653

(22) Filed: Jul. 31, 2006

(65) Prior Publication Data

US 2008/0046154 A1 Feb. 21, 2008

(51) Int. Cl.
G06F 19/00 (2006.01)
A01D 46/08 (2006.01)
A01D 69/00 (2006.01)
G06G 7/48 (2006.01)

(52) U.S. Cl. .............. 701/50; 56/10.1; 56/10.2 R; 56/28

(58) Field of Classification Search ............ 701/50, 701/56, 1, 36, 51, 53, 58, 65; 56/28, 10.2, 56/10.8, 10.9, 11.1, 36
See application file for complete search history.

(56) References Cited

U.S. PATENT DOCUMENTS

| 4,188,772 | A | 2/1980 | Jordan et al. ............... 56/10.2 |
|---|---|---|---|
| 4,896,491 | A | 1/1990 | Warnsholz et al. ............ 56/28 |
| 4,967,544 | A | 11/1990 | Ziegler et al. .............. 56/10.2 |
| 5,325,656 | A * | 7/1994 | Schreiner et al. ......... 56/10.2 H |
| 5,430,997 | A | 7/1995 | O'Halloran et al. ............. 56/6 |
| 5,488,817 | A | 2/1996 | Paquet et al. .............. 56/10.2 |
| 5,586,033 | A | 12/1996 | Hall ...................... 364/424.07 |
| 5,901,535 | A | 5/1999 | Duckinghaus et al. ....... 56/10.2 |
| 6,119,442 | A | 9/2000 | Hale ......................... 56/10.2 |
| 6,167,685 | B1 | 1/2001 | Berger et al. .............. 56/10.2 |
| 6,359,403 | B1 | 3/2002 | Pollklas et al. ............. 318/432 |
| 6,584,390 | B2 * | 6/2003 | Beck ........................... 701/50 |
| 6,587,771 | B2 * | 7/2003 | Panoushek et al. ........... 701/50 |
| 6,591,591 | B2 | 7/2003 | Coers et al. ................ 56/10.2 |
| 6,592,453 | B2 | 7/2003 | Coers et al. ................... 460/4 |
| 6,726,559 | B2 | 4/2004 | Bischoff ........................ 460/1 |

* cited by examiner

Primary Examiner—Khoi H. Tran
Assistant Examiner—Bhavesh Amin

(57) ABSTRACT

An electronic controller with a sensed ground speed input calculates appropriate cotton harvester row unit speed based on harvester ground speed and a preset ground speed versus a unit speed curve. The controller includes an automatic or manual ratio adjustment input. The ratio adjustment input allows the unit speed to be increased or decreased from the preset speed. The controller reads row unit speed via unit speed sensors and sends a signal to the unit speed actuator or electronic drive control (EDC) on a hydro, variable sheave, or other variable drive device to adjust unit speed to the calculated value. A detector or field vision device such as a camera responsive to cotton on the plants provides a signal to the automatic ratio adjustment input to change the ratio for increased productivity and reduced machine wear.

16 Claims, 4 Drawing Sheets

COTTON HARVESTER ROW UNIT SPEED SYNCHRONIZATION CONTROL

FIELD OF THE INVENTION

The present invention relates generally to cotton harvesters and, more specifically, to row unit drive structure for such harvesters.

BACKGROUND OF THE INVENTION

On spindle picking cotton harvesters, the synchronization between the ground speed and the picking unit drum speed is critical to achieve optimal picking efficiency and cotton quality. Current harvesters synchronize the ground speed to unit speed using mechanical methods such as gear drives through the ground drive transmission and mechanical linkages between hydro pumps. Mechanical systems typically provide a linear relationship between ground speed and unit speed, and synchronization can only occur in one gear range. Synchronization is lost when the transmission shifts gear or the harvester is turned from the forward direction. In addition, ground speed and unit speed synchronization is lost over time because of efficiency changes; tolerance stack-up, and part wear including tire tread wear. Improper synchronization adversely affects field efficiency and harvested cotton quality.

The mechanical drive systems do not allow easy adjustment of speed ratios to accommodate for variable field and plant conditions. For example, in heavy cotton conditions, the operator may wish to increase picker drum speed relative to row unit ground speed to increase the picker spindle density in the crop. In low yield cotton, the operator often increases harvester speed, but a proportional increase in drum speed may not be warranted since there is less cotton to engage in the row. Over-speed of the picking units increases component wear.

Current mechanical drive based systems allow the units to rotate in reverse when the machine is moved in reverse. Such operation in reverse can cause the slip clutch to activate and can drag cotton backwards against the moistener columns and doffers to adversely affect picking unit adjustment. To prevent this, the operator performs a complicated procedure which includes disengaging the units, backing up, stopping, engaging the units, and then proceeding in the forward direction.

Present mechanical drive systems require complex linkages and a relatively large number of moving parts. A direct linkage drive to the row units also allows the units to be driven when the hydro control handle is moved out of neutral position.

SUMMARY OF THE INVENTION

It is therefore an object of the present invention to provide an improved cotton harvester drive structure. It is another object to provide such a structure which overcomes most or all of the aforementioned problems.

It is a further object of the invention to provide an improved cotton harvester row unit drive structure which facilitates ground speed versus unit speed adjustment with true picking unit synchronization at all ground speeds regardless of transmission gear ratio or selected speed ranges. It is another object to provide such a structure having a sync ratio adjustment. It is yet another object to provide a cotton harvester row unit drive structure that includes a non-linear ground speed versus row unit speed capability.

An electronic controller with a sensed ground speed input calculates appropriate unit speed based on harvester ground speed from a conventional ground speed sensor and a preset ground speed versus unit speed curve. In addition, the controller includes an automatic or manual ratio adjustment input. The ratio adjustment input allows the unit speed to be increased or decreased from the preset speed. The controller reads unit speed via input from unit speed sensors and sends a signal to the unit speed actuator or electronic drive control (EDC) on a hydro, variable sheave, or other variable drive device to adjust unit speed to the calculated value.

The controller calculates the appropriate unit speed based upon ground speed and a preset ground speed versus unit speed curve. The controller is also responsive to an operator adjustment ratio input to adjust row unit speed to be a percentage faster or slower than the preset value determined by the unit speed curve. The controller reads the unit speed from unit speed sensors and then sends a signal to the unit speed actuator or electronic drive control (EDC) on the hydro or variable sheave or other suitable continuously variable transmission device to adjust unit speed to the calculated value.

A detector senses cotton remaining on the plants after they pass through the picking units and provides feedback to the electronic controller. The crop remaining feedback is used to automatically make adjustments to the speed ratio to reduce the amount of cotton left in the field. The detector can be a camera focused on the plants exiting the row unit housing or on the rows of harvested crop behind the harvester. Open cotton bolls remaining on the plants present a high white content to the camera detector to provide an easily processed signal for determining the approximate amount of cotton remaining on the plants. The speed of the picking units can be increased relative to ground speed by decreasing harvester speed or increasing unit speed when the signal from the detector indicates that unharvested cotton is above a preselected maximum level. When the signal indicates that unharvested cotton falls below a minimum acceptable level, the controller can automatically increase ground speed relative to unit speed to increase harvest productivity. The sync ratio input can be adjusted in the automatic control mode to modify the automatic control for the desired balance between acceptable amounts of crop left in the field and/or cotton quality and machine productivity. The automatic control helps maximize productivity and reduce crop damage, particularly in fields with highly varying-field and crop conditions, without operator fatigue.

The drive structure facilitates non-linear ground speed versus unit speed adjustment with true picking unit synchronization at all ground speeds regardless of transmission gear ratio or selected speed ranges. The row unit speed can be increased relative to the ground speed, for example, when the row units are first entering the rows to be harvested and the harvester is moving more slowly.

The synchronization is unaffected by drive train efficiency changes and wear. The operator can adjust picking aggressiveness on-the-go to slow or speed row unit drive relative to harvester speed to best match picking conditions and achieve the desired balance between crop loss and harvester speed for optimum productivity. In addition, the drive system allows the hydro control handle to be placed in the neutral position during tether operations. By providing electronic synchronization and eliminating a manual synchronization process during manufacturing or servicing of the harvester, including component replacement, substantial time savings is achieved. The drive structure provides improved efficiency and cotton quality by allowing ground speed to unit speed synchronization at all speeds and with adjustment capability to meet changing crop and field conditions. With electronic control, if the transmission is in gear and the units are engaged, the units will only operate when the machine is intended to move in the forward direction. The electronic control normally prevents unit operation when the harvester is reversed. If desired, the operator can move the units in reverse by putting the machine in neutral with the park brake on and then moving the hydro handle to the reverse position.

These and other objects, features and advantages of the present invention will become apparent from the description below in view of the drawings.

DESCRIPTION OF THE PREFERRED EMBODIMENT

Figure 1:
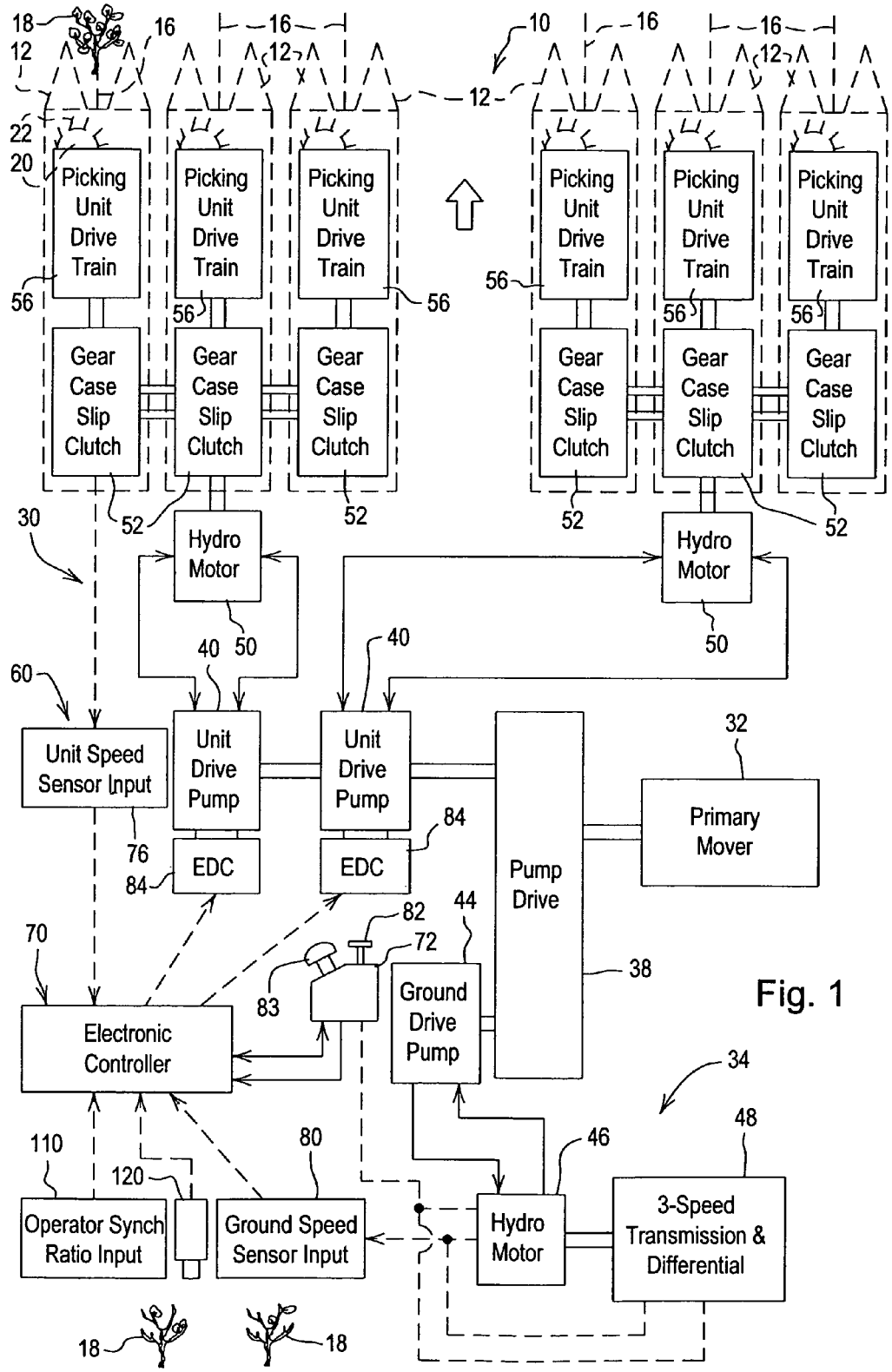
FIG. 1 is a schematic of cotton harvester belt drive structure with ground speed to picking unit synchronization.

Referring to FIG. 1 therein is shown schematically portions of a cotton picker 10 including a plurality of conventional cotton harvester row units 12 transversely spaced at the forward end of the picker and including row receiving areas 16 for receiving cotton plants 18. The row units 12 include rotating cotton harvesting structure such as upright picker drums 20 with spindles 22 for entering and rotating in the row receiving areas and removing cotton from the plants 18. The drums 20 are rotated about upright drum axes and the spindles 22 are rotated about spindle axes by picking unit drive structure indicated generally at 30. Typically the rotation of the drums 20 is synchronized to the forward speed of the harvester 10 so that for a period of time, while the spindles 22 engage the cotton plant, the velocity of the spindle relative to the plant is approximately zero.

The harvester 10 includes a primary mover or engine 32 powering the drive structure 30 and as well as a ground wheel drive structure indicated generally at 34. As shown in FIG. 1, the engine 32 is connected to a pump drive 38 which drives both unit drive hydraulic pumps 40 and a ground drive hydraulic pump 44. The hydraulic pump 44 is connected to a hydro motor 46 drivingly connected to the ground wheel drive via transmission and differential 48. The transmission 48 may be a standard three-speed transmission similar to those commercially available on present John Deere cotton harvesters or a commercially available two-range John Deere ProDrive® transmission. The drive pumps 40 are connected to row unit drive hydro motors 50 which in turn are connected through gear case slip clutches 52 to picking unit drive trains 56. Controller structure 60 is connected to the unit drive structure 30 to control drive to row units 12 and selectively provide adjustable, non-linear synchronization of the row unit drive speed relative to forward speed of the row units. As shown in FIG. 1, a first hydro motor 50 drives row units 12 on one side of the harvester 10 while a second hydro motor drives a plurality of row units 12 on the opposite side of the harvester. The rotational velocity of the spindles 22 can be directly proportional to the rotational velocity of the drums 20, or alternatively, spindle speed and drum speed can be independently controlled. For example, each hydro motor 50 could include a pair of individually controlled drive outputs independently driving the spindles and the drums to facilitate non-linear changes in the drum speed relative to the spindle speed depending on harvest and field conditions. Also, a variable transmission device such as an infinitely variable transmission or the like can be included in each picking unit drive train 56 to provide spindle drum/spindle ratio adjustments or independent spindle and drum drives.

The drive controller structure 60 includes an electronic controller 70 connected to an operator control panel area 72 in the cab of the harvester 10. A row unit drive speed sensor 76, such as gear tooth detector in the row unit drive, provides a row unit rotational speed signal to an input of the controller 70. Further details of such a structure can be found in commonly assigned U.S. Pat. No. 4,896,491 entitled HYDRAULIC ROW UNIT DRIVE FOR A COTTON HARVESTER, incorporated herein by reference. A ground speed sensor 80 provides a harvester/row unit forward speed signal to an input of the controller 70. The ground speed sensor 80 is connected to the transmission 48 and the hydro motor 46 to provide the forward speed signal. Alternatively, radar or other type of ground speed sensor may be used to provide an indication of the forward speed of the row units 12.

The transmission range of the transmission is defined by a set of buttons or other controls 82 on an armrest in the panel area 72. A hydro handle 83 determines the exact speed within a range defined by the buttons 82 on the armrest.

Figure 4:
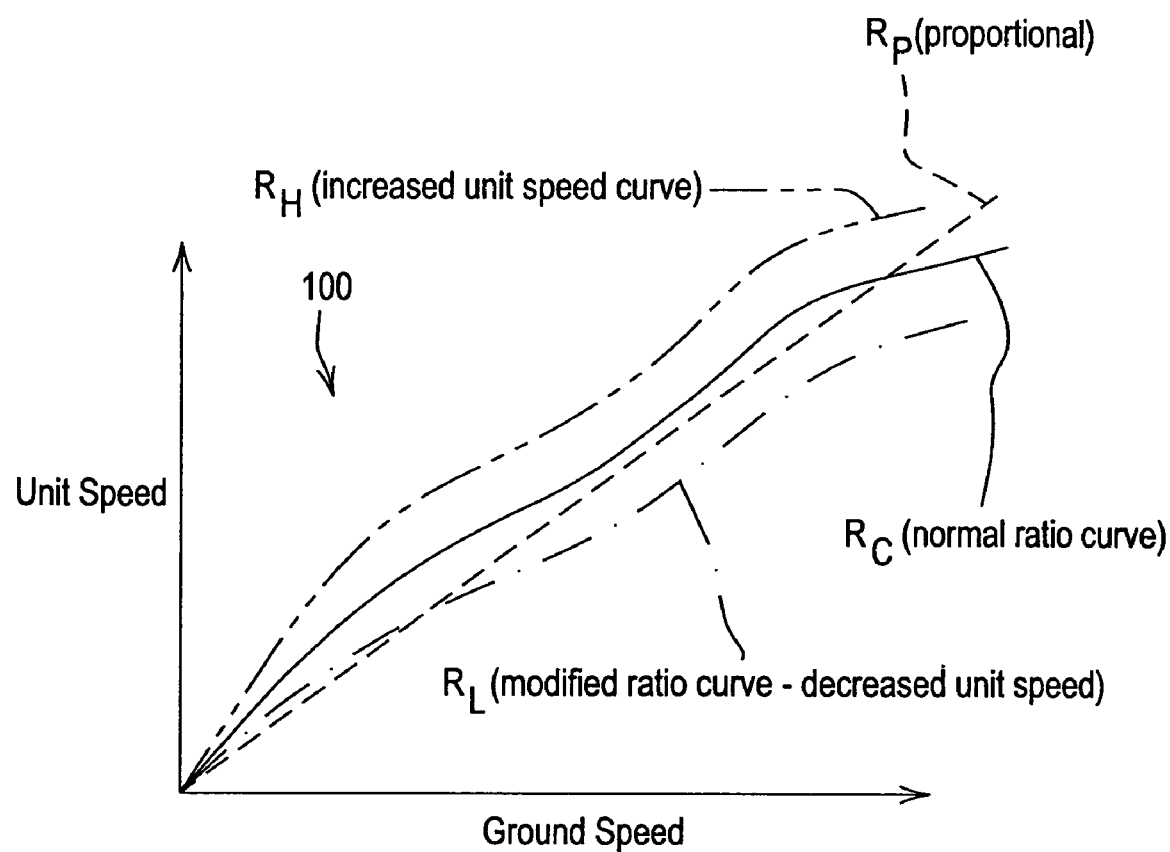
FIG. 4 is an example of a unit speed versus ground speed curve for the drive structure controller illustrating non-linearity that can be achieved with the drive structure and showing picking aggressive adjustments (upper and lower broken lines).

As shown in FIG. 1, the controller 70 is connected to electronic drive control (EDC) 84 on the unit drive pumps 40 to control motor output speed in a conventional manner. The controller receives the ground speed signal from the sensor 80 and the unit speed signal from the sensor 76 and compares the ratio of the speeds to a preselected desired ratio based upon a data curve information, such as shown in FIG. 4 at 100, stored in the memory of the controller 70 to adjust the speed to achieve the desired ratio. Typically in the past, the unit drive speed would be directly proportional to the forward speed so that a linear or straight-line Rp ratio would be followed. The operator may select the conventional Rp ratio if desired. However, using a non-linear curve such as depicted at Rc can provide improved productivity and machine performance, reduced crop loss and reduced machine wear. As shown, speed ratio control according to the curve Rc provides increased unit rotational speed (both drum and spindle; drum alone; or spindle alone) at slower ground speeds, for example, when the harvester 10 is just entering the row, to improve picking performance at the slower speeds. The ratio varies as ground speed increases, and the actual curve Rc can be modified based on past performance at different speeds and crop conditions. The controller 70 also can be set to actually learn the ratios from past experience and store the ratios as different curves which can later be selected when similar crop and field conditions are again encountered. As shown, the curve Rc tends to flatten as the harvester ground speed approaches a maximum speed to limit rotational speeds to maximum levels, for example, when the operator selects a high ground speed operation in light cotton conditions.

An operator synch control 110 is connected to the controller 110 and allows the operator to manually adjust the speed ratio to a ratio either greater than or less than the ratio determined by the ratio curve (Rc, for example). The operator can adjust the curve upwardly (Rh) to provide an increase unit speed for a given ground speed, for example, in high yield cotton conditions. Alternatively, the operator can lower the unit speed for a given-ground speed by adjusting the curve downwardly ($R_L$) to slow row unit rotational speed, for example, in low yield cotton conditions.

A crop detector 120 is connected to the controller 70 to determine a particular crop condition and automatically make ratio adjustments to help optimize a particular variable, such as crop loss or crop damage. As shown in FIG. 1, the detector 120 includes a camera which views the cotton plants after the plants pass through the row units 12. The controller processes the video signal from the detector to provide an indication of the amount of cotton left on the plants. For example, the processor can determine the percentage of pixels indicating bright white conditions typical of an opened cotton bolls-remaining on plants, and when the number exceeds a preset maximum level, the controller 70 will cause the ratio of the unit speed to ground speed to increase by speeding up the row unit drive and/or slowing the harvester speed. The detector 120 may also be mounted at the front of the machine (FIG. 2) to provide an unharvested crop condition signal to control speed ratio and machine speed according to crop conditions forwardly of the harvester 10.

Figure 2:
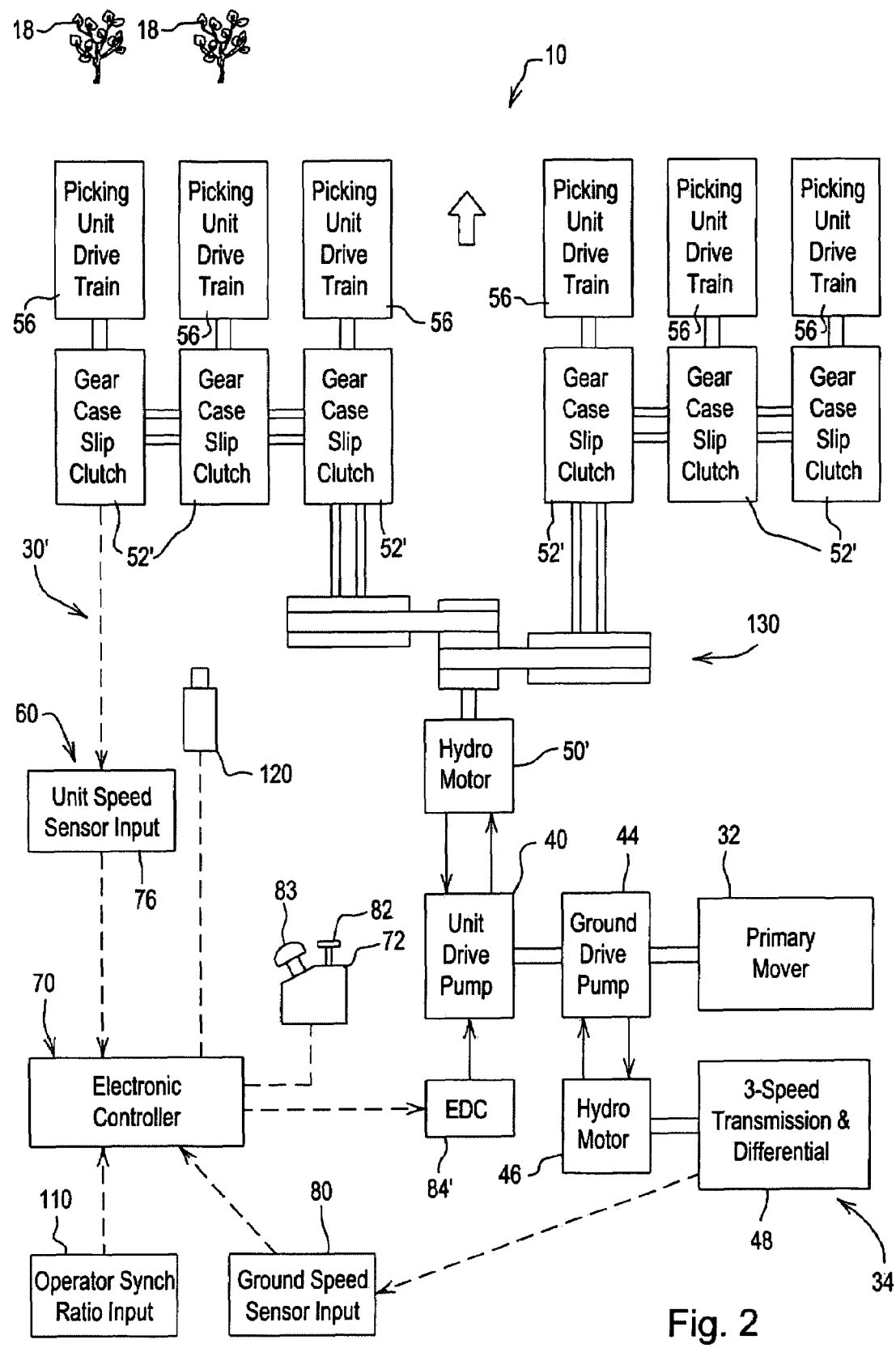
FIG. 2 is a view similar to FIG. 1 but showing direct row unit hydraulic drive.
Figure 3:
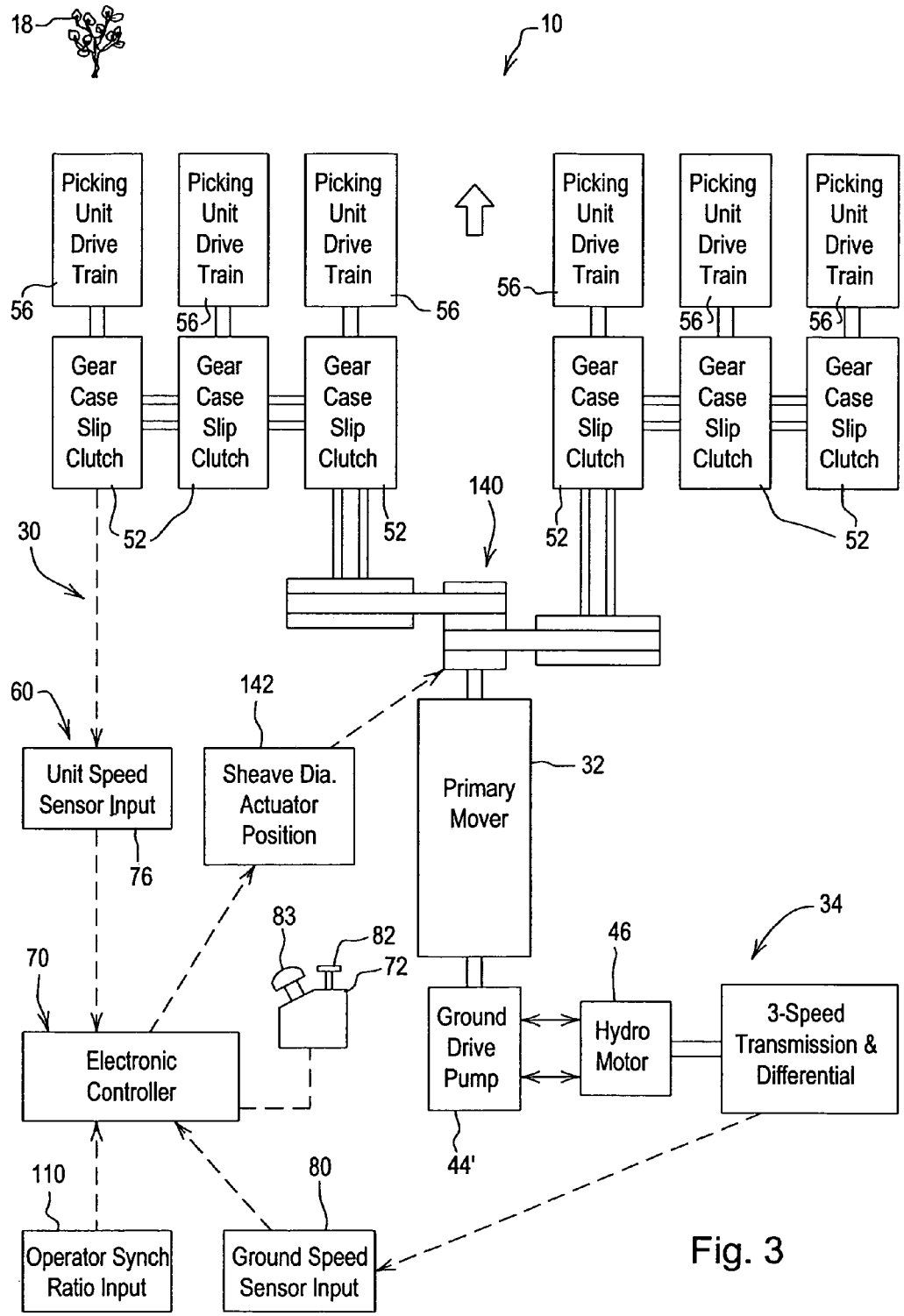
FIG. 3 is a view similar to FIG. 1 but showing a continuously variable transmission such as a variable sheave structure between the power source and the picking units.

In an alternate embodiment shown in FIG. 2, the picking unit drive 30' includes a single hydro motor 50' connected through an endless belt drive 130 to the slip clutches 52'. An EDC 84' is connected to the hydro motor 50' to control the hydro motor speed and thus the row unit drive speeds in a manner similar to that described above for the embodiment of FIG. 1. The drive and control structure of FIG. 3 is similar to that of FIG. 2, but rather than a hydro motor 50' drive, a continuously variable drive such as an adjustable sheave 140 in the belt drive is connected to the engine 32 and controlled by a sheave diameter actuator 142 controllably connected to the controller 70 to eliminate a pump and motor. The controller 70 compares the unit speed/ground speed ratio with the ratio data stored in its memory as modified by any operator sync ratio input from 110, and adjusts the sheave diameter to provide the desired unit rotational speed.

Having described the preferred embodiment, it will become apparent that various modifications can be made without departing from the scope of the invention as defined in the accompanying claims.

The invention claimed is:

1. A cotton harvester drive structure for driving a cotton harvesting row unit at a speed dependent on ground speed and for varying the speed for different harvesting conditions, the drive structure comprising:
   a variable speed row unit drive connected to the harvesting row unit and having a speed control input;
   a ground speed sensor providing a speed signal dependent on row unit ground speed;
   a drive controller connected to the speed control input and responsive to the speed signal for operating the row unit drive at a preselected speed ratio dependant on the row unit ground speed;
   wherein the drive controller includes a ratio adjustment input connected to a ratio adjusting device for varying the speed ratio from the preselected speed ratio in accordance with the harvesting conditions;
   wherein the drive controller includes a ground speed versus unit speed curve and the speed curve is non-linear and adjustable in accordance with varying crop and field conditions; and
   wherein the harvester has a maximum speed and the speed curve has a decreased slope near the maximum speed compared to the slope at harvester speeds below the maximum speed.

2. The drive structure as set forth in claim 1 wherein the ratio adjusting device includes a harvested crop detector providing an indication of the picking efficiency of the row unit, and wherein the drive controller is responsive to the picking efficiency indication to vary the speed ratio to improve the picking efficiency of the row unit.

3. The drive structure as set forth in claim 1 wherein the ratio adjusting device includes an operator control for manually selecting the speed ratio.

4. The drive structure as set forth in claim 1 wherein the ratio adjusting device includes a crop vision device sensing cotton on cotton plants.

5. The drive structure as set forth in claim 1 including a crop detector providing a crop condition signal, and wherein the controller is responsive to the crop condition signal to automatically adjust the speed curve in dependence on crop condition.

6. A cotton harvester drive structure for driving a cotton harvesting row unit at a speed dependent on ground speed and for varying the row unit speed relative to the ground speed for different harvesting conditions, the drive structure comprising:
   an electronic controller;
   a ground speed sensor connected to the controller for providing a harvester ground speed signal;
   a row unit speed sensor connected to the controller for providing a row unit speed signal; and
   wherein the controller is responsive to the ground speed signal and the row unit speed signal to provide a first row unit speed based on harvester ground speed and a preset ground speed versus unit speed curve; and
   wherein the speed curve is non-linear and has an initial slope at first harvester speeds that is steeper than the slope at harvester speeds above the first harvester speeds to provide a higher unit speed relative to ground speed ratio at low harvester speeds.

7. The drive structure as set forth in claim 6 wherein the controller includes a ratio adjustment input, the ratio adjustment varying the row unit speed from the first row unit speed.

8. The drive structure as set forth in claim 7 wherein the ratio adjustment input is connected to a crop sensor providing a signal indicative of the amount of cotton on cotton plants.

9. The drive structure as set forth in claim 8 wherein the crop sensor comprises a field vision device which determines the amount of unpicked cotton remaining on the plants that have passed through the row unit.

10. The drive structure as set forth in claim 6 wherein the controller reads row unit speed from the unit speed sensor, and including an electronic drive control (EDC) connected to the controller and to a variable speed transmission device to adjust unit speed to a calculated value determined from the ground speed versus unit speed curve.

11. The drive structure as set forth in claim 10 including a field vision device connected to the controller for determining the amount of unpicked cotton remaining on the plants, the controller responsive to the field vision device for adjusting the row unit speed relative to the harvester ground speed.

12. The drive structure as set forth in claim 10 wherein the variable speed device comprises one of the following:
   a. a hydro motor;
   b. a variable sheave;
   c. a continuously variable transmission.

13. A cotton harvester drive structure for driving a cotton harvesting row unit at a speed dependent on ground speed and for varying the row unit speed relative to the ground speed for different harvesting conditions, the drive structure comprising:
   an electronic controller:
   a ground speed sensor connected to the controller for providing a harvester ground speed signal;
   a row unit speed sensor connected to the controller for providing a row unit speed signal; and
   wherein the controller is responsive to the ground speed signal and the row unit speed signal to provide a first row unit speed based on harvester ground speed and a preset ground speed versus unit speed curve;
   wherein the speed curve is non-linear; and
   wherein the harvester has a maximum speed and the speed curve has a decreased slope near the maximum speed compared to the slope at harvester speeds below the maximum speed.

14. The drive structure as set forth in claim 13 wherein the speed curve is adjustable for varying crop and field conditions.

15. The drive structure as set forth in claim 6 wherein the row unit speed comprises cotton picker spindle drum and cotton picker spindle rotational speeds.

16. The drive structure as set forth in claim 15 wherein the spindle speed is adjustable relative to the drum speed.

* * * * *